Jan. 4, 1938.  R. C. SABINS  2,104,471
ACETYLENE GENERATOR
Filed Aug. 29, 1934   2 Sheets-Sheet 1
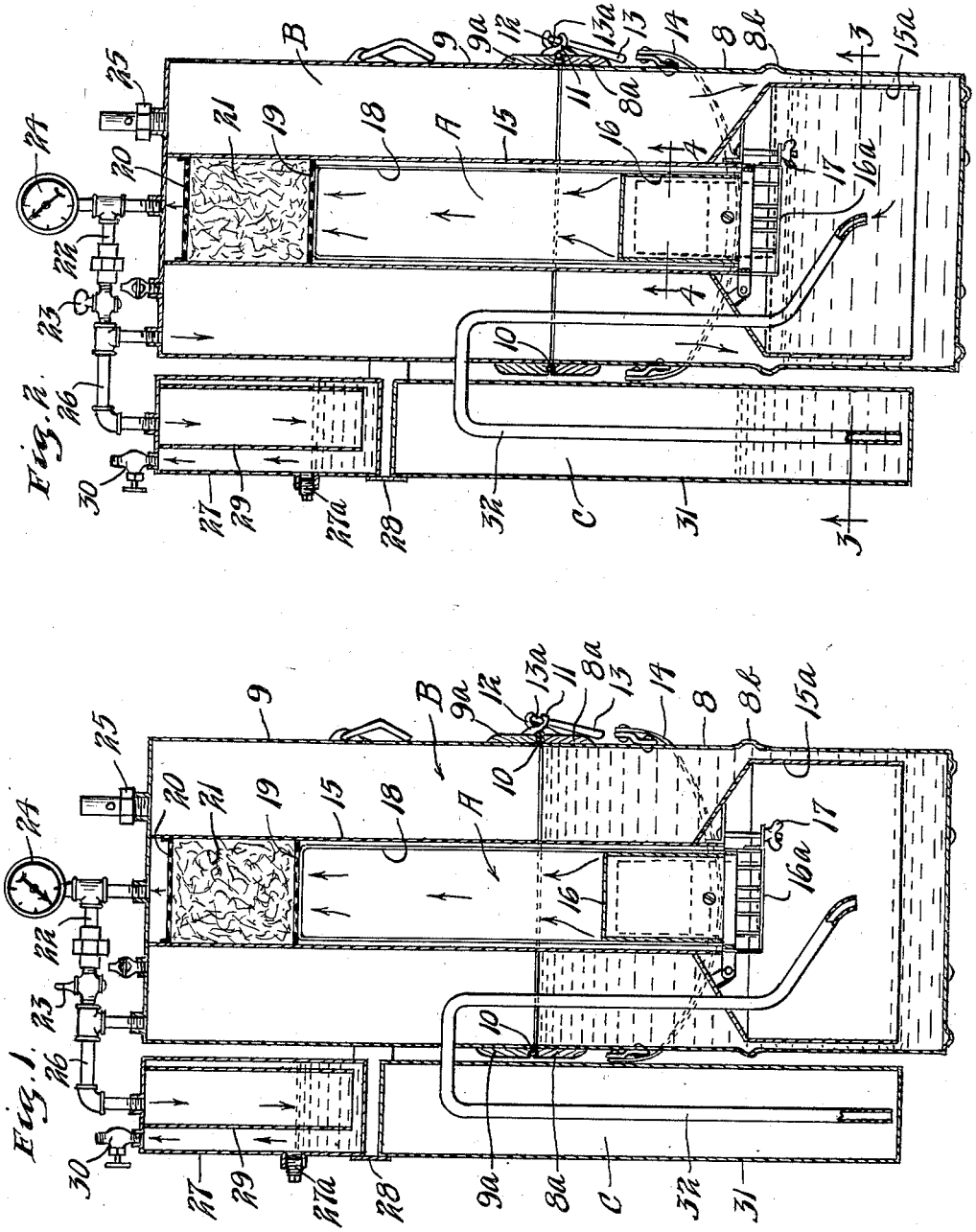
INVENTOR.
ROLLAND C. SABINS.
BY HIS ATTORNEYS.
Williamson & Williamson Jan. 4, 1938.                R. C. SABINS                 2,104,471
                          ACETYLENE GENERATOR
                          Filed Aug. 29, 1934           2 Sheets-Sheet 2
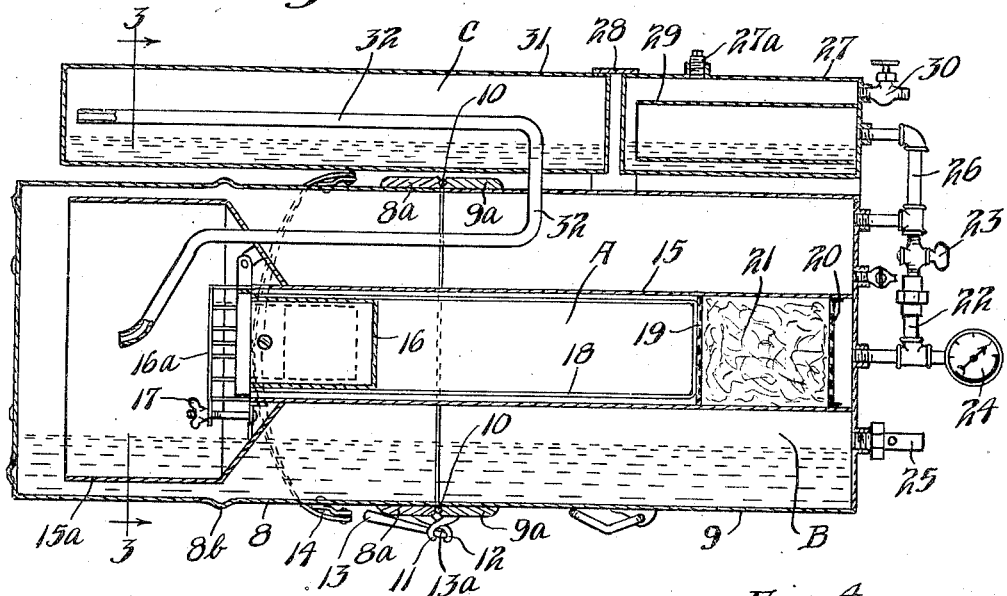
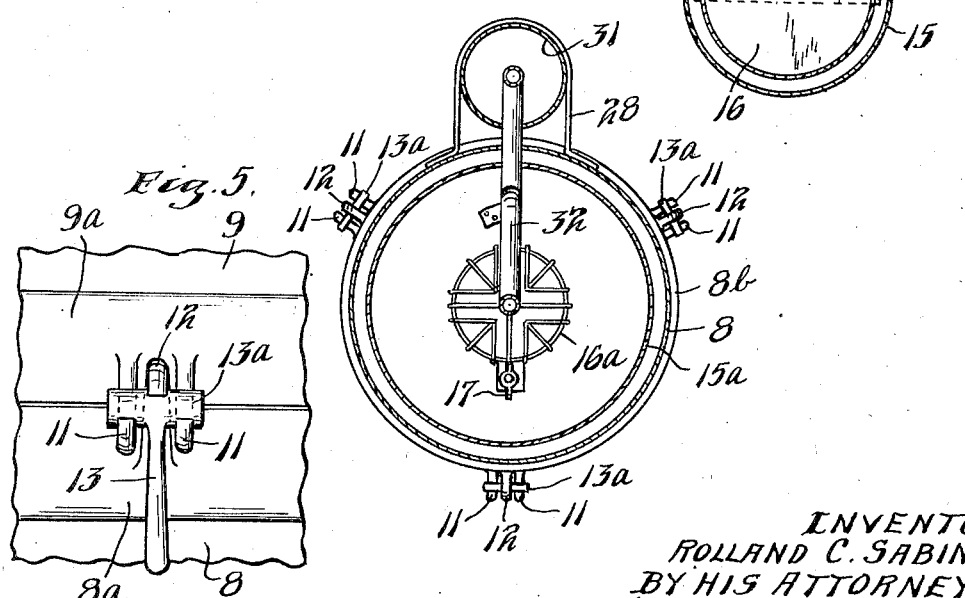
INVENTOR.
ROLLAND C. SABINS.
BY HIS ATTORNEYS.

Patented Jan. 4, 1938

2,104,471

UNITED STATES PATENT OFFICE 2,104,471

ACETYLENE GENERATOR

Rolland C. Sabins, St. Paul, Minn., assignor to Mechanical Development Co., St. Paul, Minn., a corporation of Minnesota Application August 29, 1934, Serial No. 741,919

3 Claims. (Cl. 48—22)

This invention relates to acetylene gas generators of the water recession type. In such generators contact of water with the carbide and consequently generation of gas and pressure of gas is automatically controlled by recession of water due to pressures of generated gas in chambers of the generator. Generators of the water recession type have heretofore in most instances been dangerous and have failed to secure underwriters' approval for the reason that slight leakage of valves in conduits connecting various pressure chambers or a leakage in the walls of chambers would cause or permit generation of gas faster than it could be consumed or would cause dangerous and excessive pressures to be built up in the pressure tanks when the devices were not in operation, resulting oftentimes in dangerous explosions.

This application is a continuation in part of applicant's co-pending application entitled "Autodrolic acetylene generator", Serial Number 714,105, filed March 5, 1934.

It is an object of my present invention to provide a relatively simple and highly efficient acetylene generator of the water recession type adapted to maintain a desired uniform pressure of generated gas at all times and so constructed that danger of explosion from the causes above referred to will be completely obviated.

It is a further object to provide a compact generator of the class described which may be very readily and accurately charged, filled and cleaned and which, although tipped over or tilted, will be prevented from continuing generation of gas to build up dangerous pressures.

Still a further object is the provision of an efficient acetylene generator wherein of necessity the correct proportional amounts of carbide and water must be utilized and wherein excess of water, which might in a recession system cause generation of too high a pressure, is prevented by displacement and overflow when two parts of the main casing of the device are united after charging and filling.

More specifically it is an object to provide a generator wherein two pressure chambers are utilized formed by the upper portions of a pair of casings and wherein water communication from one of said casings to the other is provided for and wherein an auxiliary recession chamber having communication with one or both of said first mentioned casings and being closed except for such communication, makes generation of high and dangerous pressures in any of said chambers impossible.

These and other objects and advantages of the invention will more fully appear from the following description, made in connection with the accompanying drawings, wherein like reference characters refer to the same or similar parts throughout the various views, and in which:—

Fig. 1 is a vertical section taken axially through an embodiment of my invention showing the water levels in the various casings as they exist after the device has been charged and assembled for operation but before operation has started;

Fig. 2 is a similar vertical section showing the water levels in the various casings during operation;

Fig. 3 is a cross section taken approximately on the line 3—3 of Fig. 2;

Fig. 4 is a cross section taken on the line 4—4 of Fig. 2;

Fig. 5 is a detail side elevation showing one of the clamping devices for effecting a sealed joint between the upper and lower sections of the main casing, and Fig. 6 is a vertical section taken through the device disposed in tipped or horizontal position and showing the water levels in the various chambers and casings and one of the safety features of the device.

As shown, my acetylene generator includes a cylindrical main casing forming a tank and comprising a lower receptacle section 8 for containing water and an upper shell section 9 having a water tight connection with said lower section. Said connection may be formed in any efficient manner and as shown reinforced flanges 8a and 9a respectively are provided on the opposing ends of receptacle 8 and shell 9. Said flanges have opposed cooperating grooves in the edges thereof between which is seated a compressible sealing ring 10. Means for clamping said casing sections together to seal the connection is provided, which, as shown, comprises three sets of clamps, each set including a pair of spaced hooks 11 secured to and depending from the lower edge of shell 9 and extending some distance below the opposing edge of receptacle 8 with their hook ends extending upwardly and a cooperating upwardly extending hook 12 secured to the upper edge of receptacle 8 and extending beyond the lower edge of shell 9 with its hooked end directed downwardly. The extremities of hooks 11 and 12 are spaced a short distance apart to accommodate insertion of a camming head 13a attached as a cross head to a clamping lever 13 and being of elliptical cross section whereby the lever may be swung downwardly after insertion of said head between the hooks to draw sections 8 and 9 together about the sealing ring 10.

Water receptacle or section 8 as shown is provided with a circumferential bead 8b which indicates the proper level to which the receptacle should be filled and a bail 14 may be attached to the upper portion of said receptacle to facilitate portability of the same.

The remaining parts of my generator are all attached to and carried by the upper section or shell 9 of the main casing. An inner casing 15 is mounted within shell 9, preferably concentrically thereof and extends from the upper closed end of shell 9 downwardly considerably below the lower end thereof and terminates in an enlarged flaring skirt 15a so positioned as to be immersed for a considerable distance in the water contained in receptacle 8 when the main casing sections 8 and 9 are joined. Casing 15 divides the space within the main casing above the water level into an inner gas containing and generating chamber A and an annular outer gas chamber B. The skirt 15a is concentrically spaced from the lower portion of receptacle 8 and terminates a short distance above the bottom of said receptacle.

Within casing 15 and disposed at the top of the flared skirt 15a is mounted a carbide magazine 16 in the form of an inverted cup-like receptacle, the upper end of which is closed and the lower open end of which is provided with a hinged support in the form of a grating. Said grating preferably has the wires or rods from which it is formed at the bottom lying substantially in a common plane and is detachably held in closed position by a clamp 17. Carbide magazine 16 may be spot welded or otherwise rigidly secured to an elongated U-shaped strap 18 which has affixed to the upper end thereof (the base of the U) a perforated disk 19 which when the magazine is operatively mounted within casing 15 is spaced some distance from the closed top of shell 9 and from a second perforated disk 20 fixed in the casing 15 a short distance below the top of shell 9. Between disks 19 and 20 suitable filtering material 21 is contained, the insertion of disk 19 into the upper portion of casing 15 serving to slightly compact the said material.

Connection between the upper portions of chambers A and B is provided through suitable conduits and fittings 22. As shown, said connections are made through the closed top of casing 9. A valve 23 is disposed medially of connections 22 and as shown a pressure gauge 24 is operatively connected with the connections 22 approximately above the center of chamber A. Pressure relief valve 25 is mounted also in the top of shell 9 in communication with chamber B. A discharge conduit 26 as shown in communication with connections 22 is connected with a flash back trap 27 which is suitably secured to the shell or upper section 9 of the device by a strap 28 which engages and is attached to the lower end thereof and by its connection with discharge conduit 26. Trap 27 as shown comprises a cylindrical tank having a drain plug 27a mounted therein to effect proper water level and having mounted therein a relatively small inner casing 29 which extends from the closed upper end of tank 27 to a point above the bottom of said tank, the lower end of casing 29 being in open communication with the lower portion of the tank. Casing 29 is of such diameter in comparison with the diameter of tank 27 that the cross sectional area of casing 29 is approximately equal to the cross sectional area of the annular space between said casing and the tank 27. A discharge valve and fitting 30 is connected with the top of tank 27 communicating with the annular chamber surrounding casing 29.

I provide auxiliary recession chamber C formed by the relatively small closed tank 31 which is also secured to and supported by the upper section or shell 9 of the main casing. The tank 31 at its upper end may be spot welded or otherwise secured to the supporting strap 28. An inverted U-shaped conduit 32 establishes communication between the lower end of auxiliary recession tank 31 and the lower portion of receptacle 8 within the flared skirt 15a. The intermediate or horizontal portion of conduit 32 passes through auxiliary tank 31 and shell 9 and a welded or other tight joint is formed around said conduit at the points it passes through said tank and shell and thereby assisting to support auxiliary tank 31 and preventing leakage of gas at such points. The extremity of conduit 32 disposed in auxiliary recession tank 31 is preferably at a slightly lower level than the opposite extremity disposed within flaring skirt 15a.

When the two sections, 8 and 9, of the main casing are uncoupled it will be seen that all of the parts of the machine with the exception of receptacle 8 are attached to shell 9 to form a unit, while receptacle 8 of itself constitutes a bucket which may be conveniently transported for filling or emptying.

The construction and proportions of receptacle 8, casing 15 and flared skirt 15a have been carefully calculated and the water level bead 8b so disposed that the displacement of water by said skirt, said casing and the air confined in said skirt when communication valve 23 is closed, will cause water level in receptacle 8 to rise to the upper edge of said receptacle. Therefore, if receptacle 8 is filled above bead 8b the excess of water will be forced out above the upper edge of receptacle 8 as the upper and lower casing sections 8 and 9 are put together with the attendant displacement of water from the skirt 15a and casing 15. Moreover, by reference to Fig. 6 it will be seen that I have so arranged casing 15, skirt 15a, carbide chamber 16 with the main casing comprising sections 8 and 9 and so proportioned the parts and controlled water levels that regardless of whether the machine is tilted in any angle or tipped to a horizontal position, water at no time can contact carbide held in the magazine 16. This is made possible by disposing the carbide magazine 16 concentrically of the main casing and in a proper calculated level with reference to the maximum water level after the device has been operated and by affording sufficient annular space between casing 15 and the main casing to accommodate maximum water content.

*Operation*

With the sections of the main casing uncoupled, shell 9 may be disposed horizontally and calcium carbide, preferably in cake or brick form, loaded into the magazine 16. Magazine 16 is of such dimensions as to hold only a predetermined number of carbide cakes, that number being the requisite number for chemical reaction with the predetermined volume of water which can be contained in receptacle 8. Carbide support 16a is then secured in operative position. Receptacle 8 is filled with water to the bead 8b or above the same and the two sections of the main casing are then joined, the displacement of water by the depending parts carried by shell 9 causing overflow of any excess water in receptacle 8 in so doing. Levers 13 will then be inserted in the clamping devices and swung downwardly to cause air tight sealing of the two casing sections 8 and 9. Valve 23 which was in closed position while the sections of the main casing were being coupled is now opened to equalize the pressures and water levels between chambers A and B. When communication is established between said chambers the resultant common water level within flaring skirt 15a and within the annular space between said skirt and receptacle 8 is slightly above the bottom of the lowest carbide brick causing contact of said water with the carbide.

Generation of acetylene gas therefore takes place and this gas works its way upwardly as indicated by the arrows in gas containing chamber A and through the filter 21. Valve 23 is normally open after the device is set up and consequently gas pressures in the two chambers A and B, as well as liquid levels will be constantly equal. As gas is generated and the pressures rise in chambers A and B, recession of water takes place through conduit 32 into auxiliary recession chamber C until such time as air pressure in said recession chamber is equal to gas pressures in chambers A and B and at which time the water level within flaring skirt 15a has receded from the bottom of the lower carbide brick.

Consumption of gas through discharge conduit 26, flash back trap 27 and valve 30, of course, lowers gas pressures in chambers A and B, whereupon the excess pressure in auxiliary recession chamber C causes recession of water from tank 31 into the main casing afforded by receptacle 8, the water level again rising within flared skirt 15a to contact the carbide.

In this manner a predetermined maintenance of gas pressure in chamber A (and of course also chamber B) is automatically effected regardless of whether gas is being consumed or not.

With my improved construction it will be readily seen that chambers A and B are in communication and that if leakage occurs in the main casing, in connections 22, conduit 26, conduit 32 or auxiliary recession tank 31, such leakage can only result in recession of water away from contact with the carbide, thereby making generation of dangerous pressures anywhere in the device impossible. It will further be seen that if the device by accident is knocked or tipped into any one of various angular positions, contact of water with the carbide is impossible whereby further dangers common to most generators now in commercial use are obviated.

The device is practically "fool proof" in view of the elimination of the dangers above referred to and in view of the self-measuring charging features, both in connection with the supply of carbide and supply of water for chemical action with that carbide.

From the foregoing description it will be seen that I have provided a portable, relatively simple and highly efficient and accurate acetylene generator which obviates the objections and dangers common to most generators of the water recession type previously used.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What I claim is:

1. An acetylene gas generator having in combination a closed casing adapted to contain water in its lower portion and forming a closed pressure accumulating gas holding chamber in its upper portion, a second casing forming a closed gas holding chamber in its upper portion and having communication at its lower portion with the lower portion of said first mentioned casing, means in one of said casings for holding carbide with the lower surface thereof at a level to be just contacted by a predetermined quantity of water within said casing when the gas within said pressure accumulating chamber is at a predetermined pressure, means for connecting the upper portions of said casings whereby pressure and water levels in said casings will equalize, gas discharge means connected with the upper portion of one of said casings, and a closed auxiliary recession chamber the lower portion of which has communication with the lower portion of one of said casings to receive receding water therefrom.

2. An acetylene gas generator having in combination a casing closed from the atmosphere and adapted to contain water in its lower portion and forming a pressure accumulating chamber in the upper portion thereof, a second casing forming a gas holding chamber in the upper portion thereof and having communication with said pressure accumulating chamber to cause pressures to equalize in said two chambers, said casings having water communication only between their lower portions and below the operating or contact level of the water, means for holding a quantity of carbide with the lower surface thereof disposed at a predetermined water contact level, and an auxiliary recession chamber independent of said casings and closed from the atmosphere and having only communication with the water in said generator at a point below the operating contact water level to receive receding water from said casings when gas pressure within said casings exceeds a predetermined amount.

3. An acetylene gas generator having in combination a casing closed from the atmosphere and adapted to contain water in its lower portion and forming a pressure accumulating chamber in the upper portion thereof, a second casing mounted within said first mentioned casing and enclosed at its upper end to form a gas holding chamber in the upper portion thereof, said second casing being spaced from the peripheral wall of said first casing and having its lower end spaced a short distance above the bottom of said first mentioned casing and in communication with said pressure accumulating chamber to cause pressures to equalize in said two chambers, said communication being below the operating or contact level of the water, means for holding a quantity of carbide with the lower surface thereof disposed at a predetermined water contact level and an auxiliary recession chamber disposed exteriorly of said casings and closed from the atmosphere and having only communication with the water in said generator at a point below the operating contact water level to receive receding water from said casings when gas pressure within said casings exceeds a predetermined amount.

ROLLAND C. SABINS.